206-497 SR
1/7/86 OR H 000.009

United States Statutory Invention Registration [19]

[11] Reg. Number: H9
[45] Published: Jan. 7, 1986

Ashmore

[54] SHRINKABLE PACKAGE WITH VENT HOLES

[75] Inventor: Charles B. Ashmore, Greenville, S.C.
[73] Assignee: W. R. Grace & Co., Duncan, S.C.

[21] Appl. No.: 775,066
[22] Filed: Sep. 11, 1985
[51] Int. Cl.[4] ..... B65D 65/00
[52] U.S. Cl. ..... 206/497; 426/106

*Primary Examiner*—S. C. Buczinski
*Assistant Examiner*—Linda J. Wallace
*Attorney, Agent, or Firm*—John J. Toney; William D. Lee, Jr.; Mark B. Quatt

[57] ABSTRACT

A method of packaging a product includes the use of an inner web of thermoplastic material and a heat shrinkable thermoplastic film, the inner web and film wrapped about a product. One or more apertures introduced at the overlapping longitudinal edge portion of film and communicating with the inner web permit escape of entrapped air inside the package during a subsequent shrinking operation. The resulting package provides a tight close fitting package characterized by extended shelf life and a store-wrapped appearance.

3 Claims, 2 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

SHRINKABLE PACKAGE WITH VENT HOLES

FIELD OF THE INVENTION

This invention relates to shrinkable packaging, and more specifically to shrink packaging for food products such as cheese.

BACKGROUND OF THE INVENTION

Thermoplastic materials are commonly used in the packaging of various products including food products. Often these materials are processed to provide a heat shrinkable film. One distinguishing feature of a heat shrink film is the film's ability, upon exposure to a certain elevated temperature, to shrink or, if restrained from shrinking, to generate shrink tension within the film. Shrink films may be manufactured by extrusion or coextension of thermoplastic resinous materials which have been heated to their flow or melting point from an extrusion or coextrusion die in, for example, either tubular or planar form. After a post-extrusion quenching to cool by, for example, the well known cascading water method, the relatively thick "tape" extrudate is then reheated to a temperature within its orientation temperature range and stretched to orient or realign the molecules of the material. Orientation temperatures will vary with the type of polymer which comprises the material, but is generally below the crystalline melting point of the material and above the second order transition temperature (glass transition temperature) thereof. Stretching of the material by tenter framing or the well known bubble process may be employed. A stretching force may be applied in one direction (uniaxial) or two directions (biaxial). An oriented, i.e. heat shrinkable material will tend to return to its original unstretched dimensions when heated to an appropriate elevated temperature.

Thus shrinkable films are specially suitable for the packaging of many food products.

It is often also desirable to include a layer of barrier material within the above formulation to provide good oxygen and/or vapor barrier characteristics to the resulting package. The end use of the package may require a low permeability to either oxygen, water vapor, or both to maintain the freshness of the food contained therein.

Food products such as specialty cheese are commonly packaged in the store, at point of sale. Typically, these food products and specialty items are hand wrapped, costing time and expense for the seller. The packaged product itself usually has a shelf-life of only a few days.

It is therefore desirable to provide pre-packaged products, such as specialty cheeses and the like, which do not require costly in-store packaging or repackaging. It is also desirable to provide a package with the look and configuration of an in-store wrapped item, in order to increase consumer appeal for the packaged item.

The present invention provides a package and process allowing for pre-packaging of food products, and utilizing a shrinkable, barrier material which provides a tight, close-fitting package with an extended shelf-life.

Of interest is U.S. Pat. No. 2,545,243 issued to Rumsey. This patent discloses a method to provide for the escape of air from the inside of a package as a plastic sheet material is secured and tightened around the package. A thermoplastic film, preferably heat shrinkable is overlapped and underlain with a parchment paper or similar material directly against the food product to be packaged. Apertures are created at several points in the overlapped layers of the packaging material, with the overlapped layers themselves being fused in the areas immediately surrounding the apertures. After closure of the package, the apertures allow entrapped air to escape during heating of the thermoplastic material in hot water to cause additional shrinking of the package. Although this reference provides for a tight casing for food products, it relies on parchment paper or similar material directly against the food product and beneath the aperatures of the overlapped areas of the package to protect that food product. This reference also requires reliance on the spiral twisting of the ends of the package to remove some of the entrapped air, followed by shrinking of the packaging material about the product to remove any wrinkles or looseness about the product.

Also of interest is U.S. Pat. No. 3,026,656 issued to Rumsey and disclosing a package for meat and dairy products and the like. A heat shrinkable, heat sealable material is preferably used. Apertures are introduced into the film so as to be offset with respect to overlapping edge portions of the film. Suction is applied to the outer surface of the overlapping layers to withdraw the entrapped air inside the package through the inner aperture, between the overlapping layers, and finally outwardly through the outer aperture. While suction is maintained, the overlapping layers are sealed together to prevent reentry of air, and the thermoplastic material is heat shrunk around the package. This method has a disadvantage of requiring careful overlapping of the film to ensure proximately spaced apertures, and also requires a separate vacuum step to draw the entrapped air from inside the package prior to the heat shrinking step.

It is an object of the present invention to provide a package and a method of packaging of food products such as cheese and the like whereby entrapped air may be withdrawn from the inside of a package without the need for vacuumization of the package.

It is also an object of the present invention to provide a package and a method of packaging food products such as cheese and the like without the need for twisting of the ends of the package to remove the entrapped air from the package through one or more apertures.

It is a further object of the present invention to provide a package and method of packaging of food products such as cheese and the like without the need for gas flushing of the packaging prior to sealing and shrinking of the packaging material.

SUMMARY OF THE INVENTION

A method of packaging food products and the like comprises wrapping an inner web of thermoplastic material around a product to be packaged; wrapping a heat shrinkable thermoplastic film around the product, such that longitudinal edges of the film are in overlapping relationship; sealing the overlapped edges; introducing at least one aperture to the overlapped edges, said at least one aperture extending through the overlapped edges and in communication with the inner web; sealing the ends of the heat shrinkable thermoplastic film and shrinking the thermoplastic film around the product to be packaged such that entrapped air may be substantially removed from the inside of the package, and the inner web forms a protective layer between the overlapped, perforated edges and the product.

In another aspect of the invention, a package comprises a product; an inner web of heat shrinkable thermoplastic material relatively tightly wrapped around the product; a heat shrinkable thermoplastic film relatively tightly wrapped around the inner web and product, said film having sealed ends, and sealed longitudinal edges in overlapping relationship; at least one aperture extending through both overlapping longitudinal edges and in communication with the inner web; the package being substantially free from entrapped air.

DESCRIPTION OF THE PREFERRED EMBODIMENTS

Figure 1:
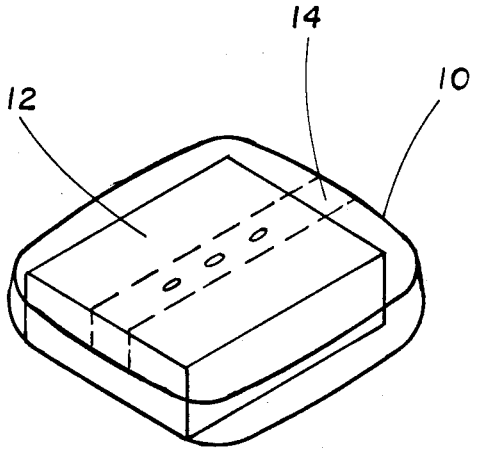
FIG. 1 is a schematic perspective view of a product loosely wrapped prior to a shrinking step in accordance with the present invention.
Figure 2:
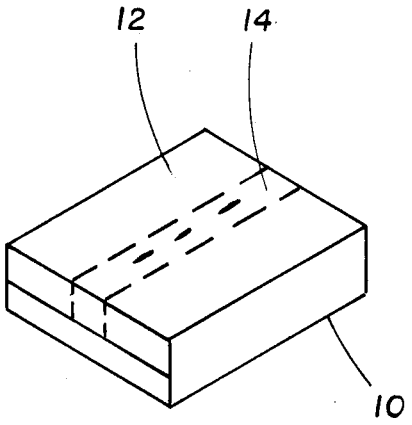
FIG. 2 is a perspective view of the product of FIG. 1 after the heat shrinking step has been completed.

Referring to FIG. 1, which is a schematic perspective view of a preferred embodiment of the present invention, a heat shrinkable thermoplastic film 10 is loosely wrapped about a product 12 to be packaged.

An inner web 14 is located inside the thermoplastic film 10 and also wrapped about the product.

In a preferred embodiment of the invention heat shrinkable thermoplastic film 10 is supplied as rollstock to a standard horizontal form-fill-seal machine. The heat shrinkable thremoplastic film itself may be made of materials designed to package the specific type of product to be packaged. For example, in food products such as cheese and the like, it is usually desirable to select a material characterized by good barrier properties, i.e. resistance to the transport of oxygen or water vapor, or both, through the thermoplastic film. The use of such barrier materials to protect a product and increase the shelf life of a product is well known. Although monolayer materials may be used multi-layer films or laminates incorporating one or more layers of barrier material may also be used. A very suitable barrier material is ethylene vinyl alcohol copolymer. The subsequent sealing steps also require a material which has the capacity of performing adequate and reliable heat seals. Therefore a monolayer or multi-layer film or laminate to be used as the heat sealable thermoplastic film should include a suitable sealant layer of a heat sealable material.

Inner web 14 may be made of the same material as thermoplastic film 10, or alternately a distinct material. The inner web is preferably attached to or carried by the thermoplastic film 10 along the inside of film 10 so that during packaging the inner web is ultimately positioned around the product and between the product and thermoplastic film 10.

The thermoplastic film 10 carrying inner web 14 around a forming plow on the horizontal form-fill-seal machine simultaneously with introduction of the product to be packaged. A lap seal is made by overlapping the edges of thermoplastic film 10 and heat sealing the overlapped edges of the package.

One or more apertures is introduced into the overlapped area of the package. This aperture extends through both overlapped edges of the thermoplastic film 10 and communicates with but does not extend through inner web 14. This arrangement provides for communication between the outside atmosphere and the entrapped air inside the package.

After the ends of the package have been sealed, the package is passed to a shrink tunnel such as a hot air shrink tunnel. The heat of the shrink tunnel heats the packaging material which thereby shrinks about the product.

It has been found that during the shrinking step, and depending on the shrink characteristics of the thermoplastic film 10, the packaging material may shrink faster than the entrapped air inside the package is able to escape. This has a tendency to balloon the package and permit inner web 14 to allow passage of air around the inner web and through the aperture or apertures previously introduced into the overlapped edge portions of thermoplastic film 10. As the shrink step is completed, and a substantial portion of the entrapped air has escaped through the aperture of the overlapped edge portions, thermoplastic film 10 and inner web 14 form a tight package about the product. The packaged product that results from the invented method is suitable for the packaging of food products such as specialty cheeses and the like. It maintains the consumer appeal necessary for consumer food products, having the appearance of a food product wrapped in the store.

A product packaged in accordance with the invention also exhibits an extended shelf life, typically about 60 days or more compared with 3 or 4 days of shelf life for packages wrapped in the store in, for example, polyvinyl chloride materials.

An additional advantage of the invention is the ability to centrally wrap food products, thereby providing a finished package for the food store or supermarket.

Although the finished product contains one or more apertures in the overwrapped edge portion of thermoplastic film 10, the tightly juxtaposed inner web 14 in communication with the one or more apertures provides a barrier tightly enclosed packaged. Suitable labels may be applied to the aperture areas of the package without fear of contacting food product, because of the presence of the protective inner web 14.

The inner web may be anchored or suitably fixed as a band strip to heat shrinkable thermoplastic film 10 either on the rollstock or at some point in the packaging procedure prior to insertion of the food product inside the formed package. Alternatively, the inner web 14 may be separately applied to the product to be packaged, and the product, so wrapped may be inserted into thermoplastic film 10 as described above.

Other suitable materials for use in accordance with the present invention include, for example, polyethylene films.

This invention has the advantage of accomplishing tight packaging of a food product without the necessity for gas flushing, or vacuumization of the package before heat shrinking. A Weldotron 1400 horizontal form-fill-seal machine may typically be employed to utilize the present invention.

The inner web 14 is preferably a web of about two inches width, or at least substantially narrower than heat shrinkable thermoplastic film 10.

Heat shrinkable thermoplastic film 10 is preferably biaxially oriented, by means well known in the art, to provide an oriented film which will shrink upon application of heat. The film 10 may also be uniaxially oriented.

It should be understood that the detailed description of the presently preferred embodiment of the invention is given by way of illustration only since various changes and modifications within the spirit and scope of the invention will become apparent to those of ordinary skill in the art upon review of the above detailed description and examples.

What is claimed is:

1. The method of packaging a product comprising:

(a) wrapping an inner web of thermoplastic material around a product to be packaged;

(b) wrapping a heat shrinkable thermoplastic film around the product, such that longitudinal edges of the film are in overlapping relationship;

(c) sealing the overlapped edges;

(d) introducing at least one aperture to the overlapped edges, said at least one aperture extending through the overlapped edges and in communication with the inner web;

(e) sealing the ends of the heat shrinkable thermoplastic film; and (f) shrinking the thermoplastic film around the product to be packaged such that entrapped air may be substantially removed from the inside of the package, and the inner web forms a protective layer between the overlapped, perforated edges and the product.

2. The method according to claim 1 wherein the inner web of thermoplastic material and the heat shrinkable thermoplastic film are simultaneously wrapped around the product to be packaged.

3. A package comprising:

(a) a product;

(b) an inner relatively narrow web of heat shrinkable, thermoplastic material relatively tightly wrapped around the product;

(c) a heat shrinkable thermoplastic film tightly wrapped around the inner web and product, said film having sealed ends, and sealed longitudinal edges in overlapping relationship; and (d) at least one aperture extending through both overlapping longitudinal edges and in communication with the inner web; the package being substantially free from entrapped air.

* * * * *